Jan. 19, 1932.  E. A. GLYNN  1,841,408
MATRIX SECURING MEANS
Filed July 6, 1929   2 Sheets-Sheet 1

INVENTOR
E. A. Glynn
BY
ATTORNEY

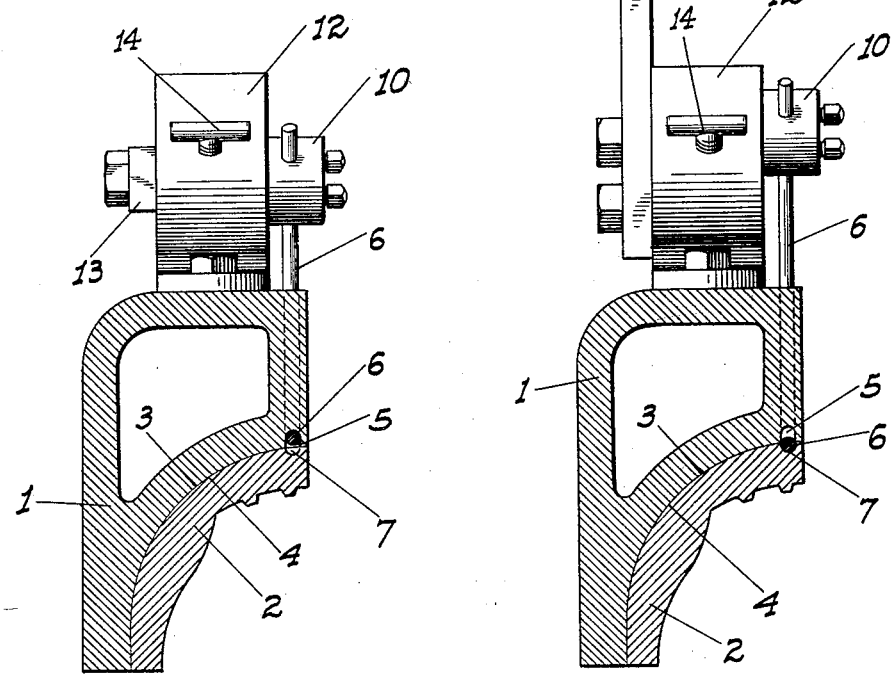

Patented Jan. 19, 1932

1,841,408

UNITED STATES PATENT OFFICE

EDWIN A. GLYNN, OF LODI, CALIFORNIA, ASSIGNOR TO SUPER MOLD CORPORATION, OF LODI, CALIFORNIA, A CORPORATION OF NEVADA

MATRIX SECURING MEANS

Application filed July 6, 1929. Serial No. 376,395.

This invention relates to tire retreading molds of what is known as the full circle type, such as is shown in Patent No. 1,710,804, to F. L. Smith et al.; and particularly relates to the means for removably mounting or holding the matrix in place in the mold.

Inasmuch as the matrix tends to adhere to the tread rubber after the retreading operations have been completed and the cooperating matrix and mold sections are being pulled apart from each other, it is necessary to positively hold the matrices in place in the molds so as to enable said matrices being pulled away from the tire to overcome the above mentioned adhering tendency. In the structure of the above patent and in similar devices each matrix section has heretofore been held in place by a plurality of studs mounted in the matrix and projecting through the corresponding mold section. For various reasons well known to those who have had occasion to use such molds this arrangement has proved unsatisfactory in service, besides calling for the expenditure of considerable time in placing and removing the matrix.

The principal object of my present invention is to avoid the objectionable features incident to the above form of construction by providing a means permanently mounted in connection with the mold for almost instantaneous engagement with or release from the matrix when the latter is placed in the mold to then effect the secure holding of the same against movement relative to the mold.

A further object is to provide a device of this character and for this purpose which engages the mold evenly through substantially its entire circumferential area and which may be moved from its operating to its releasing position or vice versa with a single movement of a lever in one direction or the other.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is an enlarged cross section of mold section and its matrix, the matrix securing means being shown in its released position.

Fig. 3 is a similar view with the securing means in its holding or operative position.

Figure 1:
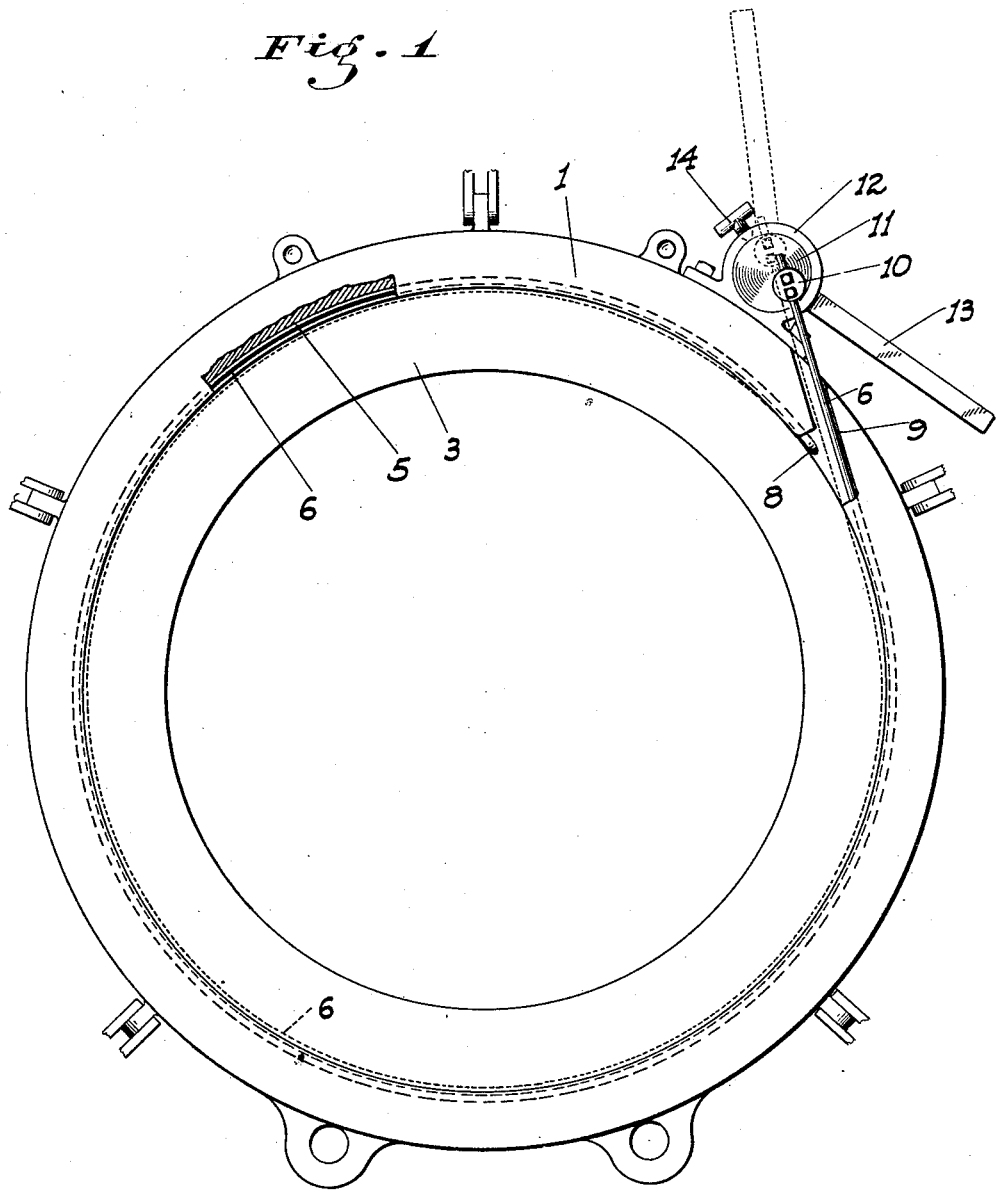
Fig. 1 is a front elevation of one mold section showing my improved matrix securing means mounted in connection therewith.

Referring now more particularly to the characters of reference on the drawings, the numeral 1 denotes an annular full circular mold section adapted to snugly receive a similarly formed matrix section 2 therein; the cooperating faces 3 and 4 of the mold and matrix respectively being substantially semi-circular in cross section.

Cut in the mold face 3 adjacent its point of greatest diameter, or close to the vertical edge of the mold which abuts against the other mold section is a continuous groove 5. The diameter of this groove is only sufficient to snugly receive a length of heavy resilient wire or light rod 6 therein, but is somewhat deeper than the diameter of said rod as shown in Fig. 2. Cut in the face 4 of the matrix section in opposed matching relation to the groove 5 is a similar groove 7, which is of the same width as the groove 5 but is only half as deep as the diameter of the rod or of semi-circular form. This rod extends continuously about the groove and thus substantially forms a ring which tends to expand due to its inherent resiliency. It will therefore be seen that the rod normally tends to lie at the bottom of the groove 5 and when in such position will not project to the face 3 of the mold so that it offers no interference with the lateral movement of the matrx into or out of position. If, however, the rod is drawn in against its expanding tendency and the operative length of the rod is reduced said rod will be moved partially out of the groove 5 and into the groove 7. Since said rod cannot possibly enter the groove 7 for more than half its depth, it still partially remains in the groove 5 and engages the same at the point of greatest width of the rod. Said rod thus forms a positive lock between the mold and matrix preventing lateral displacement of the latter relative to the mold.

To thus control the movement of the rod it is arranged in connection with an operating means as follows:

One end of the rod is anchored to the mold in the plane of the groove 5 as shown at 8. The other end adjacent the anchor leads through a tangentially extending slot 9 cut in the mold to an adjustable clamped connection with a head 10. This head is turnably mounted on and projects from one side of a rotary member 11 in eccentric relation thereto, said member being turnably mounted on a horizontal axis in a bearing bracket 12 fixed on the outer surface of the mold. A lever 13 connected to said member 11 enables the same to be rotated to cause the position of the head relative to its spacing from the slot 9 to be altered. This change of position of the head thereby causes the rod which is secured thereto to be drawn outwardly relative to the slot or to be moved inwardly thereof according to the direction in which the lever is turned. The first movement of the rod causes the portion thereof which extends about the groove to be contracted, and to thus engage the matrix as previously described. The second movement causes or allows the rod to expand so as to be seated entirely in the groove 5, clear of the matrix.

To hold the member 11 against undesired retractive rotation a hand set screw 14 is mounted in the bracket 12 to releasably engage the member 11. Apart from merely holding the matrix against outward lateral movement, it will be seen that if the rod is cinched about the matrix as tight as possible, by means of a corresponding extent of rotation of the member 11, said matrix will as well be held against possible rotation in the mold.

From the foregoing description it will be readily seen that I have produced such a device as substantially fulfills the objects of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:

1. In combination with a full-circle annular mold section and a full-circle matrix section removably fitted therein, an annular groove about the inner circumferential face of the mold, a matching groove in the corresponding outer face of the matrix, a continuous element normally disposed in the mold groove so as not to project outwardly of the same, and means for moving said element to cause it to be projected into the matrix groove while still partially projecting into the mold groove.

2. In combination with a full-circle annular mold section and a full-circle matrix section removably fitted therein, an annular groove about the inner circumferential face of the mold, a matching groove in the corresponding outer face of the matrix shallower than said mold groove but the same width, a continuous flexible element substantially the width of the mold groove but shallower than the same, normally disposed thereon so as not to project from said groove, and means for contracting said element about the matrix to cause said element to engage the matrix groove while still being partially projected into the mold groove.

3. In combination with a full-circle annular mold section and a full-circle matrix section removably fitted therein, an annular groove about the inner circumferential face of the mold, a matching groove in the corresponding outer face of the matrix shallower than said mold groove but the same width, a continuous flexible element substantially the width of the mold groove but shallower than the same normally disposed therein so as not to project from said groove, and means for contracting said element about the matrix to cause said element to enter and be clampingly engaged with the bottom of the matrix groove while still being engaged by the sides of the mold groove.

4. In combination with a full-circle annular mold section and a full-circle matrix section removably fitted therein, an annular groove about the inner circumferential face of the mold, a matching groove in the corresponding outer face of the matrix shallower than said mold groove but the same width, a continuous flexible element substantially the width of the mold groove but shallower than the same, normally disposed therein so as not to project from said groove, one end of said element being anchored to the mold in the plane of the groove therein, and the other end extending tangentially to the outer surface of the mold from adjacent said anchored end, and means applied to said other end outwardly of the mold for moving the adjacent portion of the element longitudinally in one direction or the other.

5. A structure as in claim 4, in which said means comprises a head to which said outer end of the element is clamped, a rotatable member turnably mounted on the mold on a horizontal axis and from one side of which said head projects in turnable but eccentric relation thereto, and means applied to said member for turning the same.

In testimony whereof I affix my signature.

EDWIN A. GLYNN.